United States Patent [19]
Fukai et al.

[11] 4,045,791
[45] Aug. 30, 1977

[54] APPARATUS FOR DRIVING LIQUID CRYSTAL DISPLAY DEVICE WHEREIN THE SIGNAL APPLIED THERETO IS VARIED IN ACCORDANCE WITH THE TEMPERATURE OF THE DEVICE

[75] Inventors: Masakazu Fukai, Nishinomiya; Seiichi Nagata, Sakai; Komei Asai, Hirakata; Katsuji Hattori, Uji, all of Japan

[73] Assignee: Matsushita Electric Industrial Co., Ltd., Osaka, Japan

[21] Appl. No.: 619,256

[22] Filed: Oct. 3, 1975

Related U.S. Application Data

[62] Division of Ser. No. 347,631, April 4, 1973, Pat. No. 3,921,162.

[30] Foreign Application Priority Data

Apr. 6, 1972 Japan .................................. 47-34984

[51] Int. Cl.² .............................................. G09F 9/32
[52] U.S. Cl. .......................... 340/324 M; 350/160 LC; 340/336
[58] Field of Search ............. 340/324 R, 324 M, 336, 340/166 EL; 178/30; 350/160 LC

[56] References Cited

U.S. PATENT DOCUMENTS

| | | | |
|---|---|---|---|
| 3,410,999 | 11/1968 | Fergason et al. | 350/160 LC |
| 3,524,726 | 8/1970 | DeKoster | 350/160 LC |
| 3,529,156 | 9/1970 | Fergason et al. | 350/160 LC |
| 3,551,026 | 12/1970 | Heilmeier | 350/160 LC |
| 3,725,898 | 4/1973 | Canton | 340/324 M |

*Primary Examiner*—Marshall M. Curtis
*Attorney, Agent, or Firm*—Stevens, Davis, Miller & Mosher

[57] ABSTRACT

Apparatus driving liquid crystal display device including a liquid crystal layer provided with electrodes on its two opposite surfaces, comprising means for applying a first signal for designating the electrode position and a voltage signal having a higher frequency to the electrodes on one surface, and for applying an input signal and the signal of said higher frequency to the electrodes on the other surface. The signals are controlled by another signal of different frequency to drive the display device with an ac voltage. Temperature compensation can be performed by varying the magnitude or the frequency of the voltage signal according to the temperature level.

11 Claims, 36 Drawing Figures

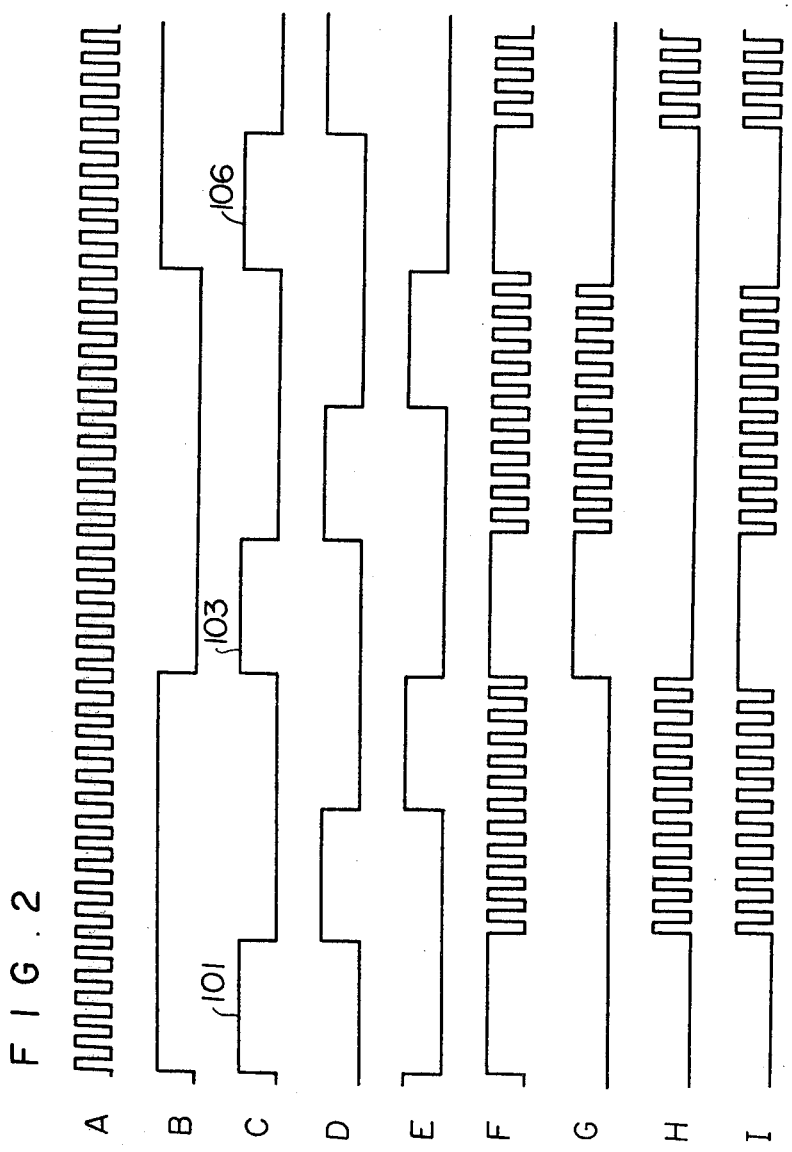

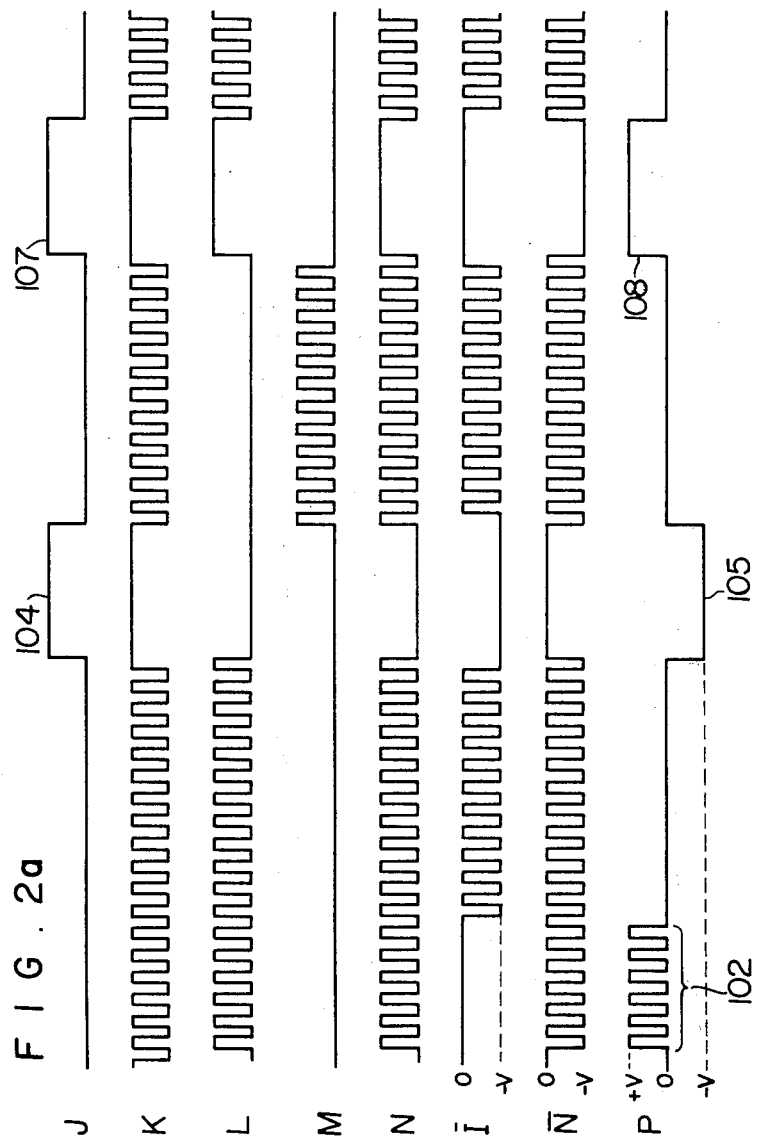

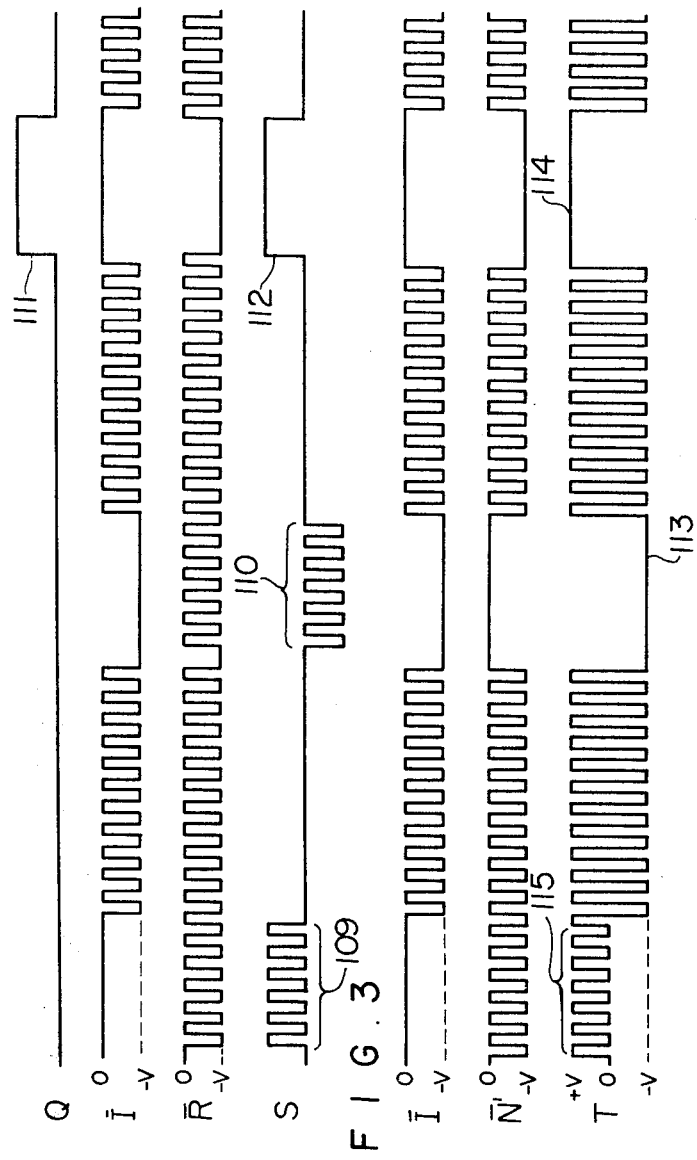

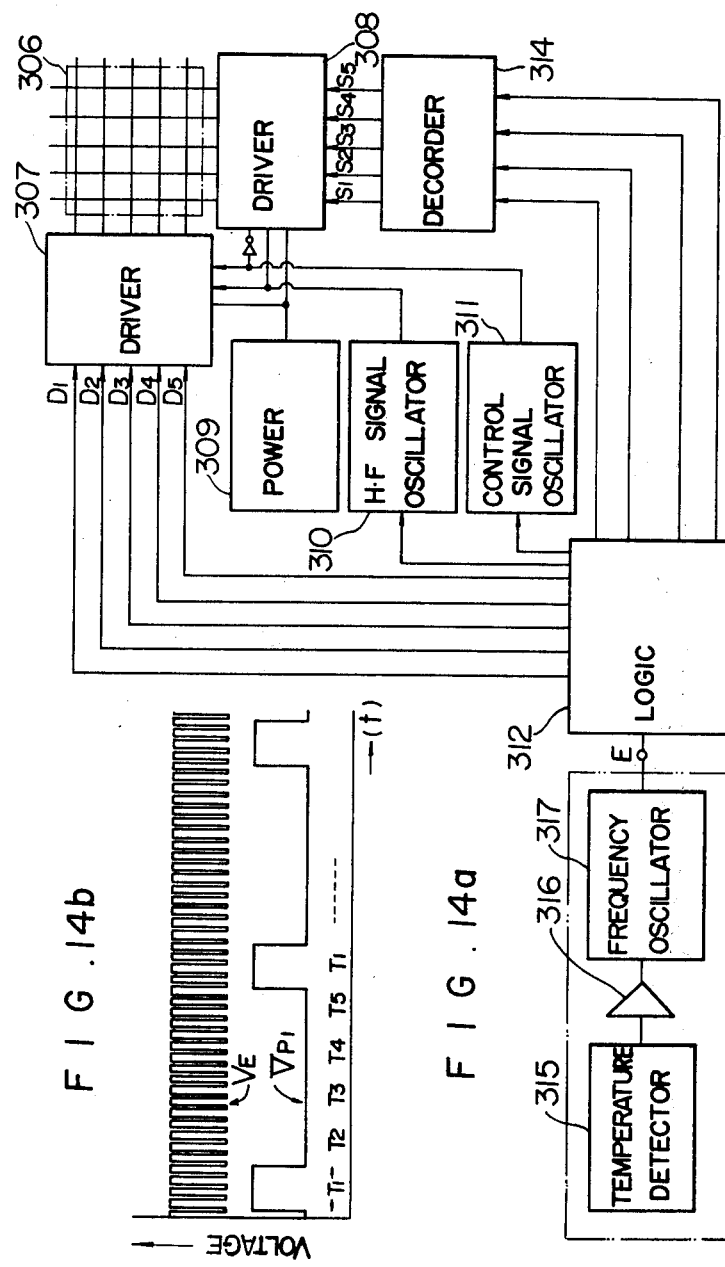

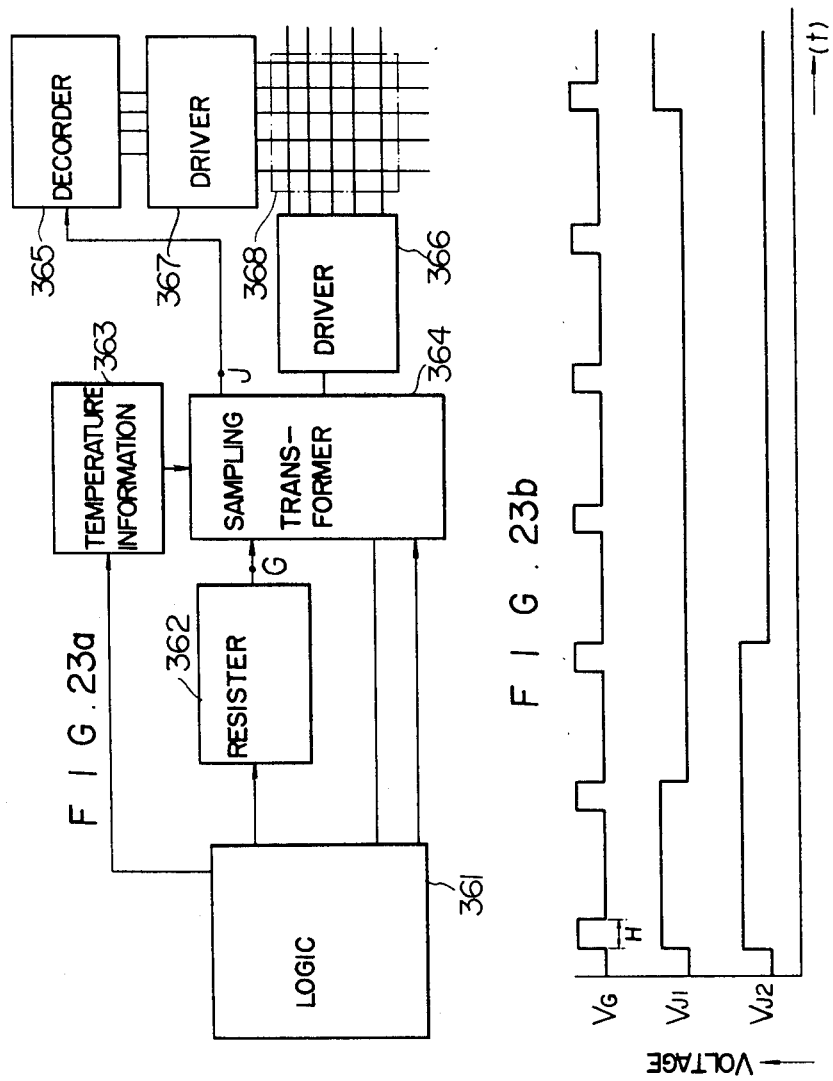

APPARATUS FOR DRIVING LIQUID CRYSTAL DISPLAY DEVICE WHEREIN THE SIGNAL APPLIED THERETO IS VARIED IN ACCORDANCE WITH THE TEMPERATURE OF THE DEVICE

This is a Division of application Ser. No. 347,631 filed Apr. 4, 1973 now U.S. Pat. No. 3,921,162.

This invention relates to apparatus for driving a liquid crystal display device.

A liquid crystal display device basically consists of a liquid crystal layer, a pair of electrodes for applying a voltage to the liquid crystal, and a voltage source connected between said pair of electrodes. The application of a voltage to a liquid crystal changes the state of the liquid crystal to which the voltage has been applied and enables a display thereby. Nematic and choresteric liquid crystals are used as the liquid crystal. The following description is based, however, on the general nematic liquid crystal hereinbelow.

When a voltage is applied to a nematic liquid crystal layer above a certain threshold voltage, it generates a turbulent state in the portion to which the voltage has been applied. This state grows as voltage is increased and reaches the so-called dynamic scattering state in which light scattering becomes extremely large. Such a phenomenon can be used to display a pattern of letters and/or figures. Namely, a pattern display can be achieved by disposing $x$ and $y$ electrodes on the two surfaces of a liquid crystal layer to form a display of the matrix structure and to produce a spatial scattering state in the liquid crystal.

In such a display, however, when a voltage is applied across selected $x$ and $y$ electrodes to excite the crossed point, adjacent crossed portions of the electrodes may also be driven into the scattering state; the so-called cross-talk phenomenon may occur. This is due to the appearance of a voltage in the neighboring electrodes through the static capacitance between the electrodes and the electrical resistivity (conductivity) of the liquid crystal. When such an induced voltage exceeds the threshold voltage of the liquid crystal, it generates a dynamic scattering state.

The cross-talk phenomenon makes the outline of the displayed pattern ambiguous and may cause a viewer to erroneously interpret the display. Thus, various methods have been proposed to substantially suppress the generation of the cross-talk phenomenon. For example, the electrodes of the $x$ axis direction are maintained at a certain voltage and those of the $y$ axis direction have a high frequency voltage of one polarity applied thereto. When an input signal is supplied, a voltage is applied to the designated $x$ electrode to generate an electric field of the same polarity as said high frequency voltage and the designated $y$ electrode is separated from the application of said high frequency voltage. By this method, a high frequency voltage is superposed on the cross-talk voltage and the composite voltage prevents the generation of the dynamic scattering state. Here, the magnitude and the frequency of the high frequency voltage is so selected that the composite voltage does not generate the dynamic scattering state. In practice, from the limitation of the circuit arrangement, the magntiude of the high frequency voltage becomes equal to the dc voltage applied to the designated pair of electrodes. Therefore, the magnitude and the frequency of the voltage applied between the electrodes should be suitably selected to drive only predetermined portions into the light scattering state. Further, this voltage application is essentially a dc drive and is accompanied with the inconvenience of short operative service life.

An object of this invention is to provide a driving a liquid crystal display device based essentially on an ac drive, and which is capable of prolonging the activation lifetime of the liquid crystal display several times beyond that for the dc drive without generating the cross-talk phenomenon.

Another object of this invention is to provide apparatus for driving a liquid crystal display device in which the driving voltage for the liquid crystal layer is controlled by the temperature of the crystal or by the ambient temperature.

A further object of this invention is to provide apparatus for driving a liquid crystal display device in which the repetition time of the voltage signal applied to the liquid crystal layer is controlled by the temperature of the liquid crystal or by the ambient temperature.

According to an embodiment of this invention there is provided apparatus for driving a liquid crystal display of matrix type including a liquid crystal layer and two groups the electrodes disposed on the respective surfaces of the liquid crystal layer comprising means for simultaneously applying a signal designating the position of the electrodes and a second voltage signal having a higher frequency than that of said first signal through the gate control by a third signal voltage having a different frequency than that of the first signal to one group of electrodes, and applying to a designated electrode of the other group of electrodes an input signal for producing light scattering in a selected portion of the liquid crystal and said second signal voltage through the gate control by said third signal voltage, thereby periodically inverting the polarity of the voltage applied to the electrodes across said selected portion of the liquid crystal.

Employing this apparatus for driving a liquid crystal display device, the polarity of the voltage applied to the display portion of a liquid crystal display of a matrix structure for producing light scattering can be reversed in time. Thus, the liquid crystal layer has applied thereto an alternating voltage of a certain period. Therefore, the activation life time of the liquid crystal becomes longer than that obtained when a voltage of one polarity is applied. This alternating voltage can be formed of signal components of one polarity. This greatly relaxes the restrictions in the circuit design of the driving unit. The effects due to the cross-talk phenomenon can be suppressed by supplying a voltage of high repetitive frequency. Further, since a matrix liquid crystal display is driven by a voltage which is controlled by temperature, the usable temperature range is greatly widened in comparison to that for a constant voltage drive. Accordingly, even when the temperature of the display is high, drive with a low pulse voltage works well and hence the lifetime of the liquid crystal can be extended.

Further objects, features and advantages of the present invention will become apparent in the following detailed description taken in conjunction with the accompanying drawings, in which:

FIGS. 2, 2a and 3 show signal waveforms at the various portions of the circuit of FIG. 1 in operation;

FIGS. 14a and 14b are a block diagram and a voltage waveform of another embodiment of the liquid crystal display according to the present invention;

FIG. 15 shows an electric connection diagram of the temperature information unit of the system of FIG. 14a;

FIGS. 23a and 23b are a block digram and voltage waveforms of another embodiment of the liquid crystal display device.

Figure 1:
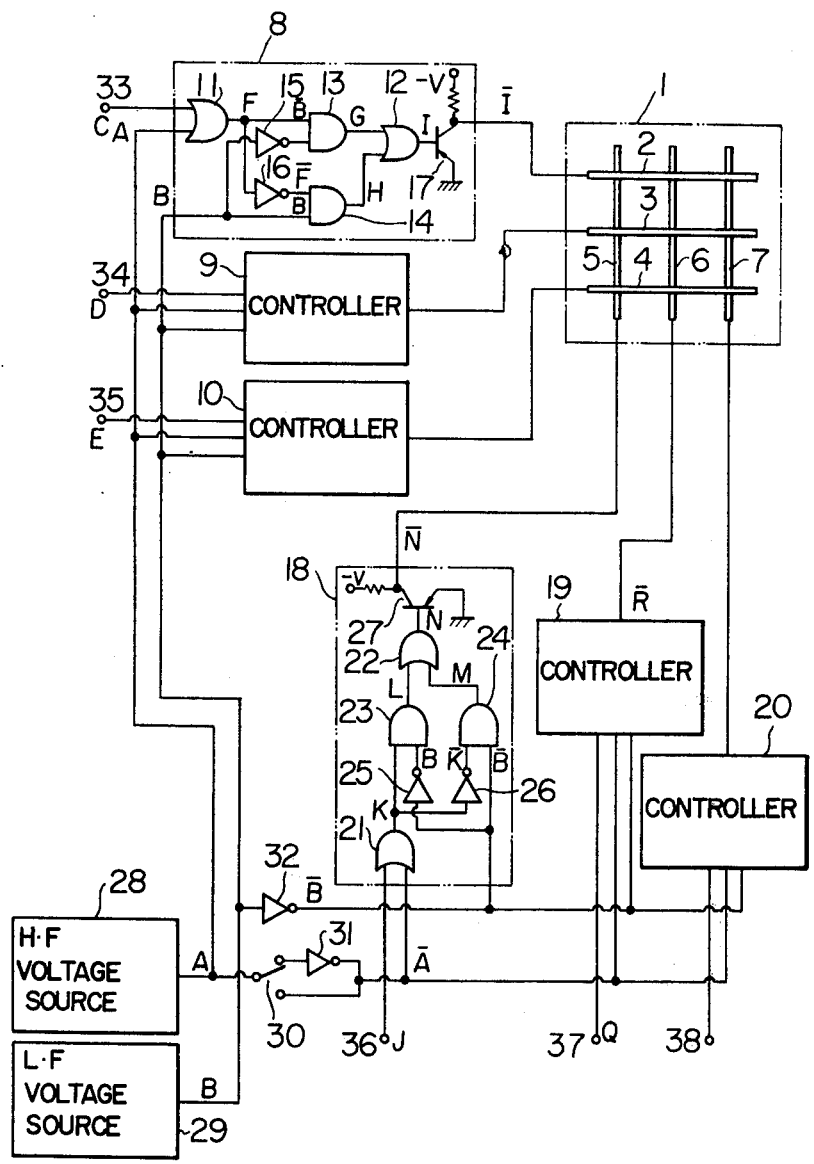
FIG. 1 is a block diagram of a structure embodying apparatus for driving a liquid crystal display device.

Now, description will be made of the first embodiment of the liquid crystal display device shown in FIG. 1 in which, the portion 1 surrounded by a dotted broken line shows a display unit of the matrix structure of three rows by three columns. Electrodes 2 to 4 in the $x$ axis direction and electrodes 5 to 7 in the $y$ axis direction are disposed at a certain spacing. Controlling circuits 8 to 10 of the same structure are connected to the $x$ axis electrodes 2 to 4, respectively. Each of the controlling circuits 8 to 10 includes OR gates 11 and 12, AND gates 13 and 14, inverters 15 and 16, and a transistor 17. Similarly, controlling circuits 18 to 20 of the same structure are connected to the $y$ axis electrodes 5 to 7. Each of the controlling circuits 18 to 20 has a similar structure as that of the circuits 8 to 10, i.e. including OR gates 21 and 22, AND gates 23 and 24, inverters 25 and 26 and a transistor 27. A high frequency (h.f.) voltage source 28 and a low frequency (l.f.) voltage source 29 are connected to the circuits 8 to 10 directly. The h.f. voltage source 28 is also connected to the circuits 18 to 20 through a change-over switch 30 the one side of which is provided with an inverter 31, while the l.f. voltage source 29 is connected to the circuits 18 to 20 through an inverter 32.

An input signal for the display unit 1 is supplied through input terminals 33 to 35 for the circuits 8 to 10 and through terminals 36 to 38 for the circuits 18 to 20.

Next, the operation of the circuit of FIG. 1 will be described referring to the voltage waveforms at the various portion of the circuit shown in FIG. 2. When the change-over switch 30 is connected to the inverter 31 side as is shown in FIG. 1, the outputs A and B of the h.f. and the l.f. voltage sources 28 and 29 are, on one hand directly supplied to the controlling circuits 8 to 10 and, on the other hand, are reversed by the inverters 31 and 32, i.e. transformed into $\overline{A}$ and $\overline{B}$, and supplied to the controlling circuits 18 to 20. To the input terminals 33 to 35, controlling signals C, D and E are applied at a constant period.

For example, in the controlling circuit 8, the output voltage A of the h.f. voltage source 28 is applied to the OR gate 11, while the output voltage B of the l.f. voltage source 29 is applied to the AND gate 14 and the inverter 15. The OR gate 11 takes a logic sum of the signals A and C to provide a signal F. This signal F and the signal $\overline{B}$ formed by reversing the signal B in the inverter 15 are applied to the AND gate 13 to provide the logic product G thereof. Further, the output F of the OR gate 11 is reversed in the inverter 16 to provide the signal $\overline{F}$ and then applied to the AND gate 14 together with the signal B. The AND gate 14 takes the logic product H of these signals B and $\overline{F}$ and supplies it to the OR gate 12. The OR gate 12 takes the logic sum of the signals G and H to provide the signal I. This signal I is amplified by a transistor 17 to become $\overline{I}$ and then applied to the electrode 2 of the display unit 1.

In the other controlling circuits 9 and 10, the signal processing is done in a similar manner.

In the controlling circuit 18 working as an input signal processing system, almost the similar operation as that in the circuit 8 is done. Namely, the signal A is inverted in the inverter 31 to form $\overline{A}$. This signal $\overline{A}$ and the input signal J from the input terminal 36 are applied to the OR gate 21 to provide the logic sum signal K. The l.f. signal B is inverted in the inverter 32 and then applied to the AND circuit 24 and through the inverter 25 to recover the signal B to the AND gate 23 together with the signal K. The AND gate 23 takes the logic product of K and B and provides the signal L. Further, to the AND gate 24, the output $\overline{K}$ of the inverter 26 and the output $\overline{B}$ of the inverter 32 are supplied to generate the signal M. The signals L and M are supplied to the OR gate 22 to provide the logic sum N which is amplified in the transistor 27 to become $\overline{N}$ and then applied to the electrode 5 of the display unit 1.

Similar operations are done in the controlling circuits 19 and 20.

Now, provided that the terminal J has no input signal applied thereto when the first pulse 101 of the controlling signal C is applied to the terminal 33, the pulse train 102 of the signal P shown in FIG. 2 is applied to the liquid crystal between the electrodes 2 and 5. When the next pulse 103 of the controlling signal C and a pulse 104 of the signal J are applied synchronously, the pulse 105 of the applied voltage P will be applied to the liquid crystal through the electrodes 2 and 5. If the next pulse 106 of the signal C and a pulse 107 of the signal J further arrive in synchronism, a pulse 108 of the voltage P will be applied between the electrodes 2 and 5. If the pulses 103 and 106 occur at times of different level for the signal B, the voltages 105 and 108 applied between the electrodes 2 and 5 become of different polarity.

When an input of the waveform Q shown in FIG. 2 is applied to the input terminal 37, a voltage of the waveform $\overline{R}$ shown in FIG. 2 will be supplied from the controlling circuit 19 to the electrode 6. If there is no pulse in the signal Q, which coincides with the pulses 101 and 103 of the signal C, pulse trains 109 and 110 of a voltage S will be applied between the electrodes 2 and 6 corresponding to the pulses 101 and 103. These pulse trains 109 and 110 corresponds to the pulses 101 and 103 and have different levels. Therefore, the polarities of these pulse trains 109 and 110 become mutually opposite. At the time when there is a pulse 111 in the signal Q corresponding to a pulse 106 of the signal C, a pulse 112 of the voltage S will be first applied between the electrodes 2 and 6.

When said pulses 103 and 104 have arrived, the pulse voltage 105 will be applied between the electrodes 2 and 5. At this moment between the electrodes 2 and 6, the pulse train voltage 110 is applied. Therefore, if cross-talk occurs between the electrodes 5 and 6, this pulse train voltage will be superposed on the cross-talk voltage and hence the affects of cross-talk voltage will be removed. Namely, the cross-talk voltage is caused by the phenomenon that when an input voltage is applied only to a particular electrode, for example, in the x axis direction, the applied voltage may be transferred to other y axis electrodes through an adjacent x axis electrode or electrodes. In the present embodiment, however, the h.f. voltage is applied between the y axis electrodes except the one applied with an input and the x axis electrodes. Thus, the affects of the cross-talk voltage will never appear. Therefore, it is possible to apply a voltage to only a desired portion of the liquid crystal layer to produce the dynamic scattering state.

When the change-over-switch 30 is changed from the shown state to the other side to apply the h.f. voltage A to the controlling circuits 18 to 20 directly, a voltage as shown by the waveform T of FIG. 3 will be applied between the electrodes 2 and 5. Here, for the signal shown by the waveform C of FIG. 2, the signal $\overline{T}$ will be applied to the electrode 2. This is the same as the preceding case. For the signal J of FIG. 2, since the inverter 31 is removed from the circuit, a signal as shown by the waveform $\overline{N}'$ of FIG. 3 will appear, which has a different phase for the h.f. voltage component from the waveform $\overline{N}$ of FIG. 2. For the pulses 104 and 107 of the signal J, pulses 113 and 114 of a voltage T will be applied to the electrode 5. If there exists no pulse in a corresponding position, a pulse train 115 will be applied. As mentioned above, a substantial a.c. voltage is applied across the layer of liquid crystal at the cross point of the display matrix according to the drive method which results in extending the service life of the liquid crystal. This method may be called an a.c. dynamic drive method.

In a concrete example, a small amount of dopant was doped in a nematic liquid crystal. The resultant liquid crystal layer was supported between a pair of substrates separated by a gap of 12 microns. The l.f. voltage source had an output repetition frequency of 100 Hz, and a duty ratio, i.e. the ratio of the repetition period of a pulse to the pulse width, of 9 : 1. The h.f. voltage source had an output frequency of 5 KHz. Control signals of 50 Hz were applied to the electrodes in the x axis direction. The amplitude of the driving voltage for the liquid crystal was selected at 50 V. Under these conditions, light scattering could be caused only in desired portions.

Figure 4:
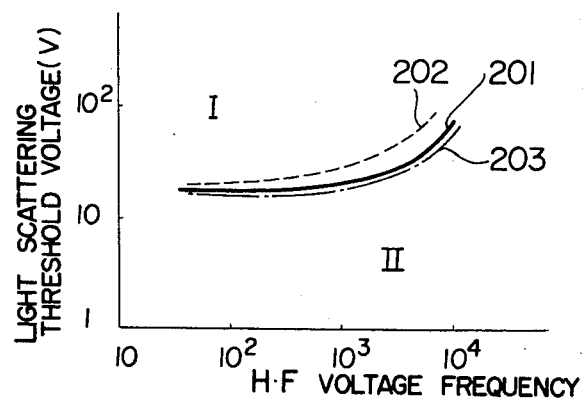
FIG. 4 shows operational characteristic curves of the display of FIG. 1.

FIG. 4 shows the relationship of the threshold voltage for causing light scattering in the liquid crystal and the repetition frequency of the h.f. voltage with parameters taken for the repetition periods of the control signal and the l.f. voltage. Solid line 201 represents the characterisitc when the repetition period of the l.f. voltage is two times as long as that of the control signal, i.e. the repetition period of the signal applied to the electrodes in the x axis direction. Broken line 202 represents the characteristic when the repetition period of the l.f. voltage is two times as long as the pulse width of the control signal. Dotted broken line 203 represents the characteristic when the repetition period of the l.f. voltage is much longer than that of the control signal.

In the figure, the region denoted by I is the dynamic scattering region and the region denoted by II is the non-scattering region. As is apparent from the figure, among the above three cases the threshold voltage becomes higher when the repetition period of the l.f. voltage is two times as long as the pulse width of the control signal. Thus, the affects due to the cross-talking phenomenon can be effectively suppressed in this case.

In the above description, the repetition period of the l.f. voltage was longer than that of the control signal, but it may be shorter than the repetition period of the control signal.

Further, the electrodes in the above embodiment were disposed in parallel with the x and y directions. Usually in a display for a multi-figure number, the electrode segments corresponding to the respective numbers are connected to common lead-out terminals. It will be apparent that the present invention will be modified in such displays having modified matrix structures.

Futher, in the present embodiment, the controlling signal for driving a particular cross point, i.e. the first signal, the h.f. signal for preventing cross-talking, i.e. the second signal, and the l.f. signal, i.e. the third signal may be mutually in synchronous relation.

Figure 5:
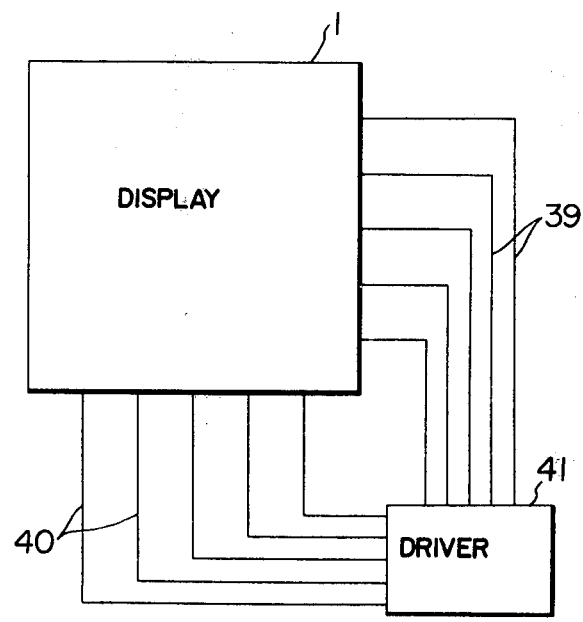
FIG. 5 shows the schematic structure of a matrix liquid crystal display.

Next, the second embodiment of this invention will be described. In the preceding embodiment, the controlled signal (hereinafter referred to as "pulse driving voltage"), and the h.f., l.f. signals (hereinafter referred to as "a.c. signal voltages") have the same amplitude and are applied to a cross point of the matrix independent of the temperature of the liquid crystal or the ambient temperature. According to this method, however, when the temperature is subjected to variations and the repetition frequency of the pulse driving voltage signal is fixed, there arises a problem that the perfect control of light scattering at a particular cross point and non-scattering at other cross points can be done only in a narrow temperature range. The following embodidment improves the preceding embodiment, in which the repetition frequency of the pulse driving voltage is fixed, but a temperature detector is provided in or near the display to drive the liquid crystal at a cross point of the matrix with the pulse driving voltage and the a.c. signal voltage having an amplitude controlled by the temperature information supplied from said temperature detector. Thereby, the temperature region in which said display can be controlled perfectly can be widened and hence the operation lifetime of the liquid crystal is extended. Now, detailed description will be made on the second embodiment in connection with FIG. 5, in which numeral 1 indicates a liquid crystal display of the matrix structure similar to that of FIG. 1, 39 and 40 conductive lines for applying an electric field to the liquid crystal at a cross point in the matrix, i.e. lead-out wires connected to the electrodes on the liquid crystal, and 41 a driving circuit of the a.c. dynamic driving method for driving the liquid crystal display 1 by the time sharing driving method. The driving circuit 41 includes a temperature detector in or near the display 1 and supplies the pulse driving voltage and the a.c. signal voltage controlled by the temperature information detected by said detector to drive the liquid crystal.

Figure 6:
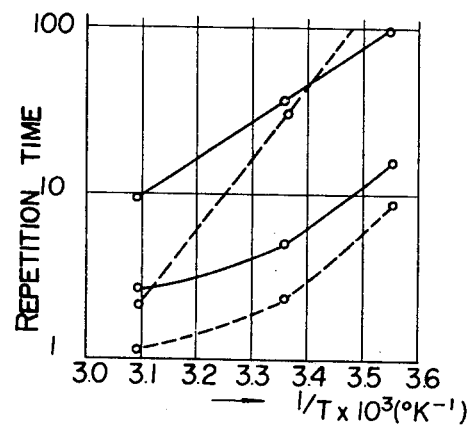
FIG. 6 shows the controllable region for a liquid crystal as a function of the temperature and the repetition time of the voltage signal.

FIG. 6 shows the temperature region in which the driving can be done provided that the driving voltage is fixed independently of the temperature. Curves show the upper and lower limits of the controllable region. More particularly, the region surrounded by or sandwiched between the dotted lines above the region in which the display is controllable under the conditions of a driving voltage of 40 V and the frequency of the h.f. signal of 15 KHz, while the region surrounded by the solid lines shows that for a driving voltage of 30 V. For example if the repetition time of the pulse driving voltage and the a.c. signal voltage is fixed at 10 milliseconds, the temperature range in which the display can be properly controlled is from about 14° C to about 50° C when the pulse driving voltage is 30 V and from about 5° C to about 35° C when the pulse driving voltage is 40 V.

When the temperature in or near the liquid crystal display 1 is detected and the pulse driving voltage is controlled thereby, the temperature range of the proper control widens greatly. For example, if the pulse driving voltage is arranged to become 30 V about 30° C and 40 V below 30° C, the temperature range in which the matrix liquid crystal display 1 is useful as a display widens to the region of 5° C to 50° C as can be seen from FIG. 6. thus, the useful temperature region can be made considerably wider than that for the constant voltage drive. Further, as is apparent from FIG. 6, the driving voltage can be lower as the ambient temperature for the display is higher. Thereby, the operation lifetime for a liquid crystal at a high temperature can be made longer than that of the liquid crystal employing the constant voltage driving method. In the first embodiment, the driving voltage was set unnecessarily large at higher temperatures, and the liquid crystal allows an excess current to flow by such amount. As a result, the excess current works to shorten the operation lifetime of the liquid crystal, but such an excess current can be prevented in the present embodiment. In the present embodiment, the pulse driving voltage may be varied gradually or stepwise at a certain temperature or temperatures as is the case in the foregoing example on the basis of the detected temperature.

Figure 7:
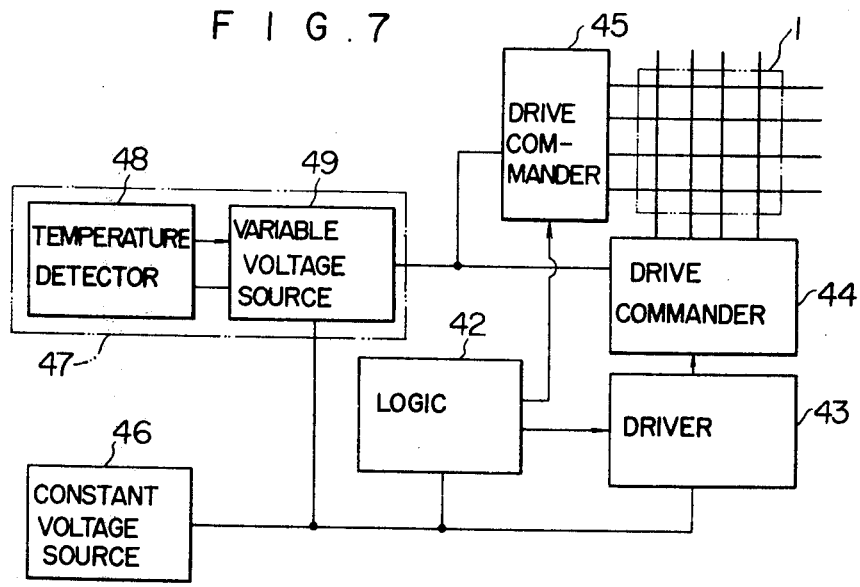
FIG. 7 is a block diagram of an embodiment of the present liquid crystal display device.

A concrete example will be described hereinbelow. First, FIG. 7 shows a liquid crystal display in the case of controlling the pulse driving voltage by a temperature detection signal, in which a numeral 42 indicates a logic circuit of a time sharing driving unit, 43 a drive commander for liquid crystal driving circuit units 44 and 45, for example a decoder. These circuits are supplied power from a constant voltage source 46. A variable voltage source unit 47 includes a variable voltage source 49 controlled by the signal of a temperature detector 48. Said variable voltage source 49 may be an independent unit and may be a variable voltage converter supplied power from the constant voltage source 46. The driving circuit units 44 and 45 for a liquid crystal display 1 are connected to the lead-out systems of the rows and columns of the matrix and driven by the variable voltage source 49. Therefore, the pulse driving voltage for the liquid crystal layer in the display 1 is naturally dependent on the output voltage of the variable voltage source 49.

Figure 8A:
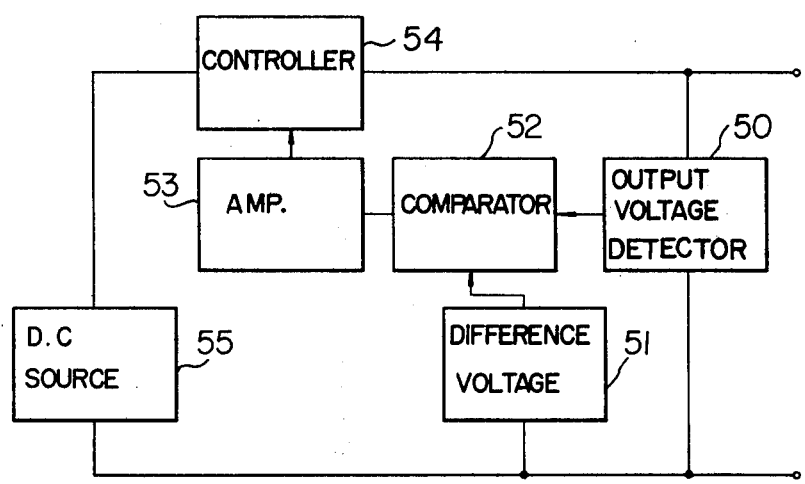
FIGS. 8a and 8b are schematic diagrams of the variable voltage source used in the structure of FIG. 7.
Figure 8B:
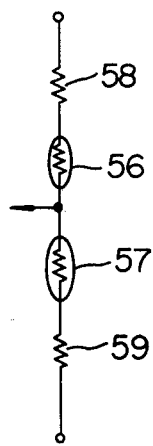

FIG. 8a is a detailed block diagram of the variable voltage source unit 47 of FIG. 7 which is well known as a stabilized power source. Namely, the output voltage detected in an output voltage detector is compared with the voltage of a reference voltage unit 51 in a comparator 52 and the differential voltage is amplified through an amplifier 53 and controls the conductance of the controlling unit 54 to control the output voltage of a d.c. source 55 in a negative feed-back fashion. Here, if the output voltage detector 50 is formed as is shown in FIG. 8b, the output voltage of the circuit of FIG. 8a decreases as the temperature increases. In FIG. 8b, numeral 56 indicates an element having a characteristic such that the resistance decreases with the temperature, for example a negative characteristic thermistor, while numeral 57 indicates an element the resistance of which increases with increased temperature, for example a positive characteristic thermistor. Resistors 58 and 59 divide the voltage for setting the detection voltage. In this structure, one of elements 56 and 57 may be dispensed with if the circuit arrangement allows it.

When the power from said variable voltage source is coupled to a liquid crystal display means as described in the embodiment of FIG. 1, a liquid crystal display having a remarkably increased practical value can be provided. In this embodiment, the driving voltage is generated by the supply of power from the output of said variable voltage source of the negative polarity. This is also true for the amplifying means of other rows and columns.

Figure 9:
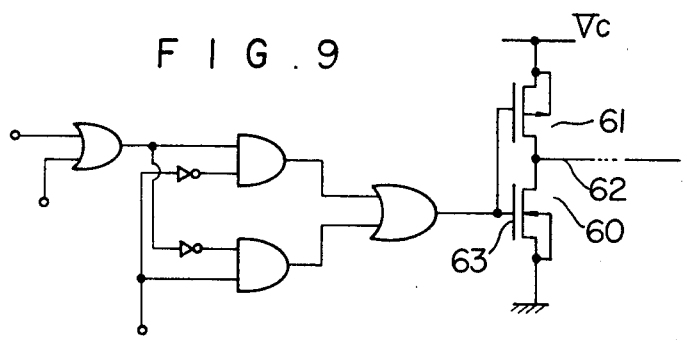
FIG. 9 shows another embodiment for driving a liquid crystal using a dc variable voltage source and employing dc time sharing according to the present invention.

FIG. 9 shows another of the amplifying means which may be used in the circuit of FIG. 1, e.g. that for the first row, in which a transistor is replaced with complementary MOS transistors. Transistors 60 and 61 are of n- and p- channel type MOS transistors. Such an amplifying means is connected to the lead-out conductor of the first row of the matrix liquid crystal display device through an output electrode 62. For example, if the potential of the gate electrode 63 is 1 in the positive logic, the transistor 60 is closed, the transistor 61 is opened and the potential of the common drain 62 becomes 0. When the potential of the gate electrode 63 is 0, the transistor 60 is open and the transistor 61 is closed to drive the potential of the common drain 1 equal to the source voltage $V_o$. Such amplifying means may be connected to the respective lead-out conductors of the rows and columns to achieve a similar function. In such a case, the power for these complementary MOS transistors is supplied from said variable voltage source of positive polarity.

Figure 10A:
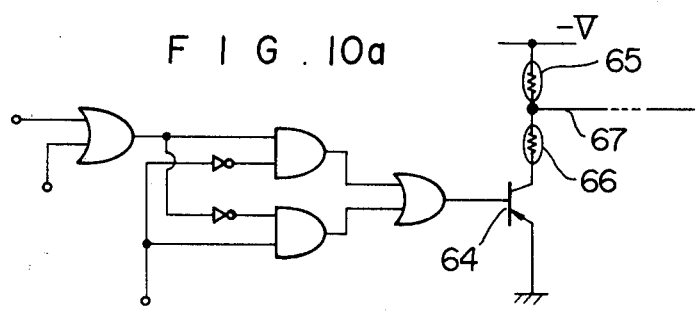
FIGS. 10a and 10b show embodiments for supplying a constant voltage to a liquid crystal driving unit and substantially varying the driving voltage for the liquid crystal.
Figure 10B:
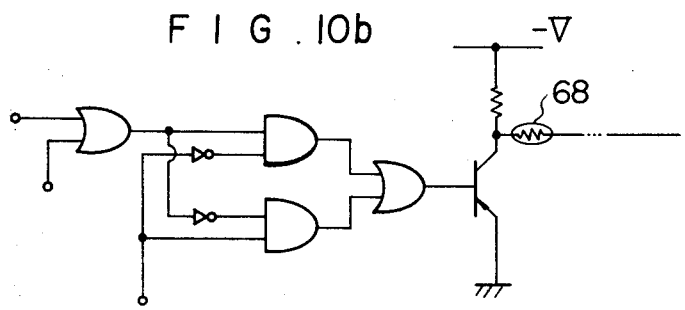

FIGS. 10a and 10b show circuit examples for maintaining the supply voltage for the liquid crystal driving circuits 44 and 45 at a constant value and effectively varying the voltage applied to the liquid crystal according to the temperature. FIG. 10a shows one amplifying means for the respective amplifying means similar to FIG. 9, in which elements 65 and 66 having a temperature dependent resistance are connected as a load for the transistor in the amplifying circuit of FIG. 1. The element 65 has a resistance decreasing with increases in the temperature, for example a negative characteristic thermistor, and the element 66 has a resistance increasing with increases in the temperature, for example a positive characteristic thermistor. In such a circuit, the voltage amplitude at the output electrode 67 is given by $R_{66}/(R_{65} + R_{66})$ according to the on-off switching of the transistor 64. When the resistances $R_{65}$ and $R_{66}$ of the elements 65 and 66 vary as described above, the output voltage is also changed according to the temperature. Here, one of the elements 65 and 66 may be replaced with a usual fixed resistance. Further, a plurality of such amplifying means as described above can be connected to a plurality of leadout systems of the rows and columns as needed.

FIG. 10b shows another example of the amplifying means in which an element 68 having a characteristics similar to that of element 66 is used. When such circuits are used as the amplifying means for the lines, the amplifying means for the columns should be formed of those of the type shown in FIG. 1, and vice versa.

Figure 11A:
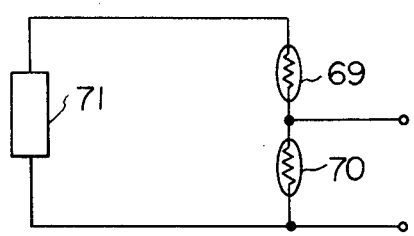
FIGS. 11a to 11d show examples of the power source which varies the output voltage according to the temperature.
Figure 11B:
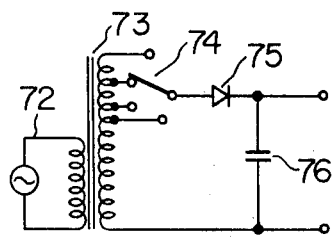
Figure 11C:
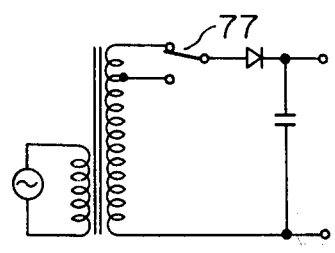
Figure 11D:
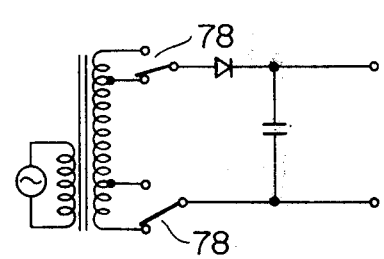

FIGS. 11a to 11d show examples of the d.c. voltage source, the output of which varies with the temperature. In FIG. 11a, the output voltage of a d.c. voltage source 71 is divided by resistive elements 69 and 70 having similar characteristics to those of elements 65 and 66 of FIG. 10a. Thus, the output voltage across the element 70 varies with the temperature. In FIGS. 11b to 11d, a variable d.c. voltage is provided from an a.c. power source or a d.c. - d.c. contverter. In FIG. 11b, an a.c. voltage from an a.c. voltage source 72 is transformed into various a.c. voltages through a transformer 73 having a plurality of output terminals. A suitable voltage is selected by a switch 74 according to the temperature and rectified through a diode 75 and a capacitor 76. FIG. 11c shows an example in which a bimetal switching element 77, which is similar to switch 74 of FIG. 11b, turns on and off the contacts according to the temperature. FIG. 11d shows an example in which a pair of such switching elements 78 having different activation temperature is used. In the examples of FIG. 11b to 11c, the output voltage varies not smoothly but stepwise.

Now, the third embodiment of this invention will be described, in which the liquid crystal at a selected cross point is driven with a voltage having a frequency controlled by the temperature information. It is to be noted here that in the first embodiment a pulse voltage and an a.c. signal voltage of a constant repetition time and a constant amplitude are applied to a selected cross point, whereas a voltage having an amplitude controlled by the temperature information is applied to a selected cross point in the second embodiment.

Figure 12:
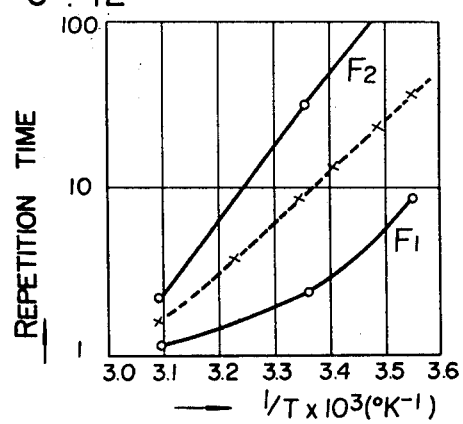
FIG. 12 shows the controllable region for a liquid crystal as a function of the temperature and the repetition time of the voltage signal.

FIG. 12 shows the relationship between the repetition period of the voltage signal capable of driving a liquid crystal and the temperature. In the figure, the region surrounded by solid lines represents the region in which the display can be controlled by the application of a signal voltage of 40 V and a h.f. signal having a frequency of 15 KHz. Thus, if the repetition time of the voltage signal is fixed irrespective of the ambient temperature, for example if the repetition time of the driving voltage and the a.c. signal voltage is fixed at 10 milliseconds, the temperature range in which the liquid crystal can be used as a display is only from about 5° C to about 35° C.

When the ambient temperature of a display is detected to control the repetition time of the voltage signal, for example when the repetition time of the voltage signal can be set at 10 milliseconds below 35° C and at 2.5 milliseconds above 35° C in said liquid crystal matrix display device, the temperature range in which the liquid crystal matrix display can be used as a display becomes from 5° C to 50° C as is apparent from FIG. 12. Thus, the operative temperature range can be greatly broadened by changing the repetition time of the voltage signal compared to the system of driving a liquid crystal with a voltage signal of constant repetition time. Further, as the result, the liquid crystal is driven by a voltage signal of shorter repetition time as the temperature increases higher and the operative service life of a liquid crystal display device at higher temperatures can be prolonged.

As is described above, according to the present embodiment of a matrix liquid crystal display driven by the time sharing method, a temperature detector is provided near the display and the liquid crystal display is driven by a pulse driving voltage and an a.c. signal voltage having a repetition time controlled by the temperature information derived from said temperature detector, and thereby the operative temperature range for the display can be widened and the operative service life of the display can be prolonged. In the present embodiment, the repetition time of the voltage signal for driving a liquid crystal display can be varied gradually or stepwise according to the temperature of the display detected by a temperature detector.

Figure 13A:
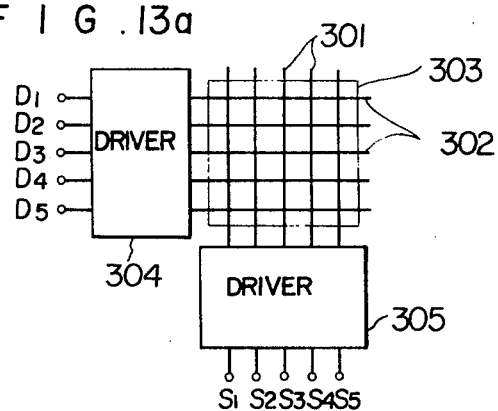
FIGS. 13a and 13b show the principles of the present liquid crystal display device.
Figure 13B:
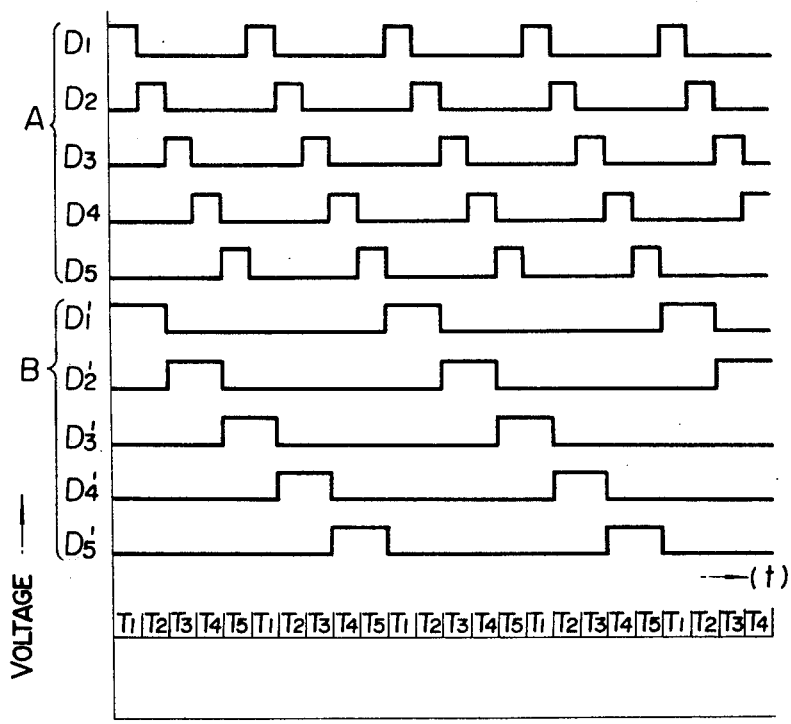

FIG. 13a is a schematic diagram of a matrix liquid crystal display of the present embodiment, in which numerals 301 and 302 indicate conductor systems of columns and rows for a matrix liquid crystal display 303. Driving circuits 304 and 305 are connected to the conductor systems 302 and 301 for applying a voltage to the liquid crystal layer. The input terminals $D_1$ to $D_5$ of the row (or column) driving circuit 304 are applied with voltage signals having, for example, waveforms A of FIG. 13b at a certain temperature. When the temperature is varied, it is detected and thereby voltage signals having a repetition time controlled by the detected temperature information are applied in place of the signals A. For example, voltage signals having waveforms B of FIG. 13b having the same duty ratio as that of the signals A but a repetition time two times as long as that of the signals A are applied to the terminals $D_1$ to $D_5$. It will be apparent that this repetition time may be varied gradually with the temperature or stepwise at certain temperatures.

When the repetition time of signals applied to the driving circuit 304 is changed, that of signals applied to the input terminals $S_1$ to $S_5$ of the other driving circuit 305, for example from a decoder should also be changed in a similar manner.

Now, a detailed concrete example of a liquid crystal display having applied thereto voltage signals of controlled repetition time will be described referring to FIGS. 14a and 14b. In FIG. 14a, a matrix liquid crystal display 306 is driven by the signal voltages supplied from driving circuits 307 and 308 both of which are supplied power from a power source 309, a h.f. signal oscillator 310 for erasing cross-talk and a l.f. signal oscillator 311 for driving the display 306 by the a.c. dynamic drive. The signals from the oscillators 310 and 311 are synchronized with the signal from a logic unit 312. The logic unit 312 is activated by the signal from an oscillator unit 313 and supplies predetermined signals to the driving circuit 307 and a decoder 314. For example, when the waveform at point E of FIG. 14a is as shown by $V_E$ of FIG. 14b (referred to "clock signal", hereinbelow), a signal as shown by $V_{D1}$ of FIG. 14b is applied to the terminal $D_1$ of the driving circuit 307 through the function of the logic circuit 312. Therefore, if the repetition time of the clock signal $V_E$ is varied, the repetition time of the signal $V_{D1}$ is also varied accordingly. In the oscillator unirt 313, the signal derived from a temperature detector 315 is amplified in an amplifier 316, if necessary, and controls the output frequency of a variable frequency oscillator 317.

Figure 15:
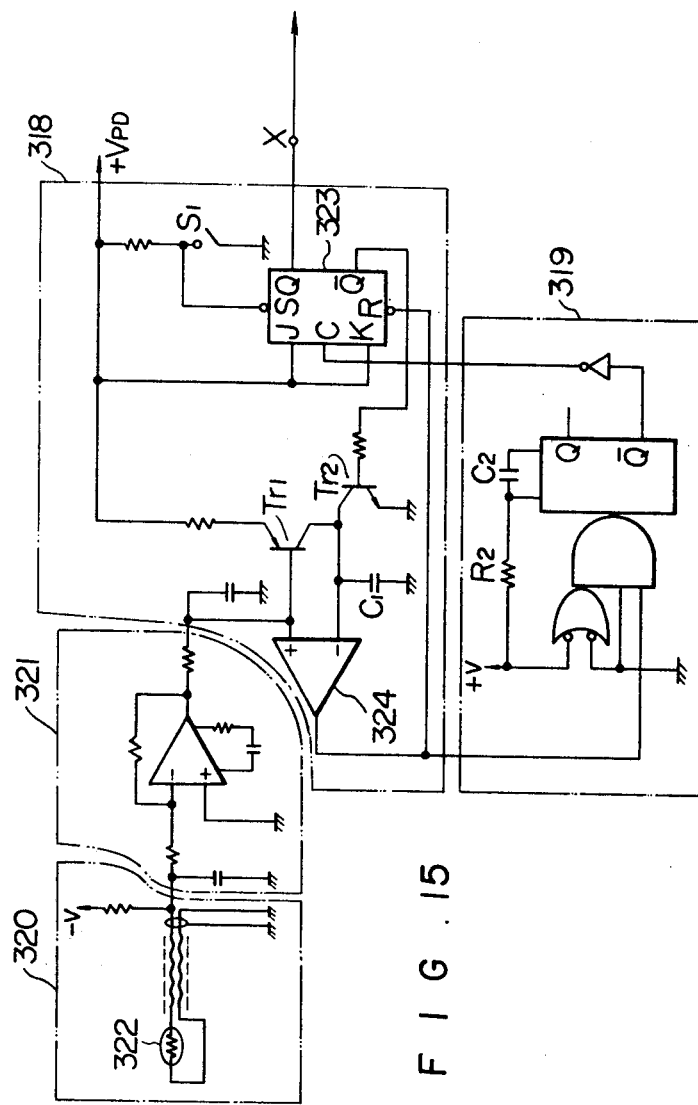

FIG. 15 shows a concrete circuit example of the oscillator unit 313, in which monostable multivibrators 318 and 319 repeat the supply and reception of the triggering signal to perform continuous oscillation. The monostable multivibrator 318 is featured by the addition of a detector 320 and an amplifier 321. The variational resistance of a negative characteristic thermistor 322 due to a temperature change is read out potentiometricly, then amplified with an appropriate amplification and supplied to the next stage as a reference voltage $V_{rf}$.

Next, the function of the circuit of FIG. 15 will be described referring to voltage waveforms of FIG. 16. When a trigger switch $S_1$ is closed (c.f. waveform a of FIG. 16), the output $\overline{Q}$ of a flip-flop 323 becomes 0 (c.f. waveform b of FIG. 16) to open a switching transistor $Tr_2$. Then the collector current of a constant current source transistor $Tr_1$ controlled by the reference voltage $V_{rf}$ from the amplifier 321 charges a capacitor $C_1$ (c.f. waveform c of FIG. 16).

Figure 16:
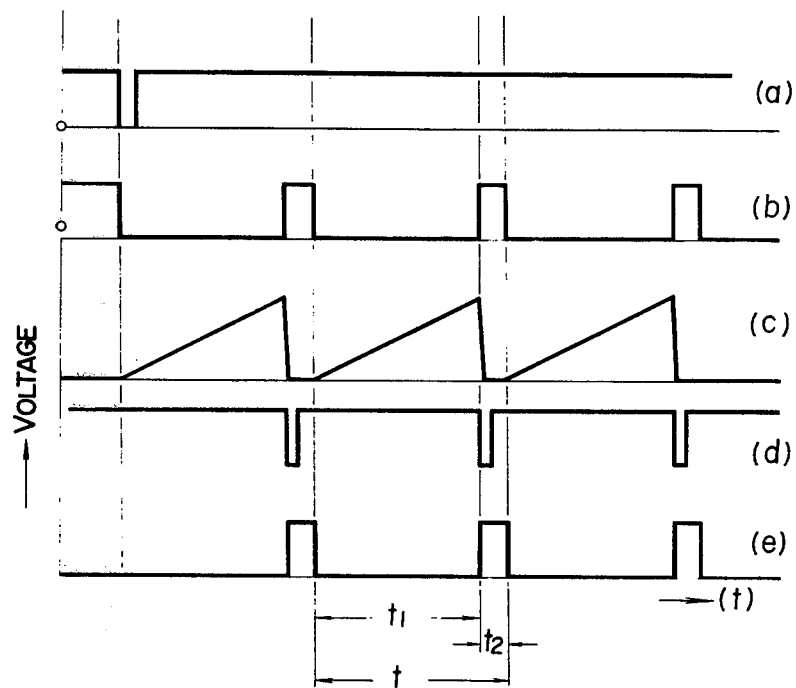
FIG. 16 shows voltage waveforms at the various portions of the circuit of FIG. 15.

When the voltage $V_{c1}$ of this capacitor $C_1$ becomes equal to said reference voltage $V_{rf}$, the voltage comparator 324 is activated to change its output from 1 to 0 (c.f. waveform d of FIG. 16). This negative pulse resets the flip-flop 323 and closes the switching transistor $Tr_2$ to discharge the capacitor $C_1$, while it also triggers the other multivibrator 319 to invert it into a meta-stable state (c.f. waveform e of FIG. 16).

The monostable multivibrator 319 returns to the stable state after a time period determined by $R_2$ and $C_2$. The capacitor $C_1$ finishes discharging at this moment and the signal at the recovery of the monostable multivibrator 319 sets the flip-flop 323 again.

Thus, the switching transistor $Tr_2$ is opened again and the capacitor $C_1$ begins to be charged. The above process repeated in this manner to continue oscillation.

The thermistor 322 has a high resistance at low temperatures and low resistance at high temperatures, therefore the output voltages of the amplifier 321 becomes large at lower temperatures and small at higher temperatures. This output voltage $V_{rf}$ becomes the reference voltage for the voltage comparator 324 and the base voltage of the constant current source transistor $Tr_1$. When said reference voltage $V_{rf}$ is low, the emitter-base voltage of the transistor $Tr_1$ becomes large, hence the collector current increases to increase the charging speed of the capacitor $C_1$. Further, since the comparison voltage for the voltage comparator 324 is low, the inversion time of the monostable multivibrator 318 becomes short. When the reference voltage $V_{rf}$ is high, the collector current of the transistor $Tr_1$, i.e. the charging current for the capacitor $C_1$, is small. Further since the comparison voltage in the voltage comparator 324 is high, the inversion speed of the monostable multivibrator 318 becomes slow. Thus, in the system combining monostable multivibrators 318 and 319, the repetition time t becomes the sum of the inversion times $t_1$ and $t_2$ of the monostable multivibrators 318 and 319. In the circuit of FIG. 15, $t_2$ is about 10 microseconds and constant but $t_1$ is continuously variable over three digits from about 20 microseconds to about 20 milliseconds when the reference voltage $V_{rf}$ is varied independently of the amplifier 321.

Figure 17:
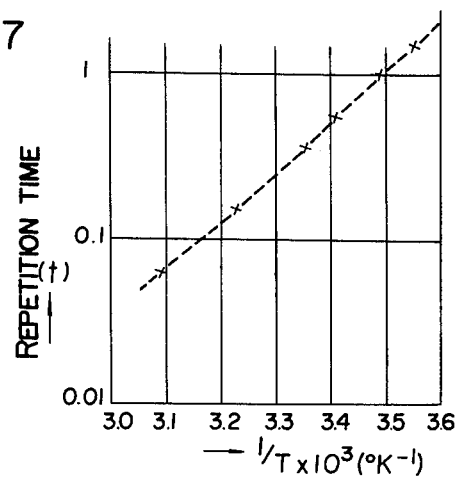
FIG. 17 shows the repetition time of the output signal of the circuit of FIG. 15 as a function of the inverse of the temperature.

The relation of the temperature and the repetition time t when the temperature of the thermistor 322 is varied in the circuit of FIG. 15 is shown by a dotted line in FIG. 17. This signal is supplied to the logic circuit unit 312 in the circuit of FIG. 14a. The logic unit 312 thereby generates signals $D_1$ to $D_5$ and $S_1$ to $S_5$ which change with the temperature. Such changes are transmitted to the liquid crystal display 306 through the driving circuits 307 and 308. Now provided that the signal from the oscillator unit 313 of FIG. 14a obeys the relation of the temperature and the repetition time of FIG. 17 and the duty ratio of the signal from the logic unit 312 is 1/7, the relation of the repetition time of the voltage signal applied to the liquid crystal display 306 and the temperature becomes as shown by the dotted line of FIG. 12. As is apparent from FIG. 12, when a liquid crystal layer is driven with a voltage signal the repetition time of which varies with the temperature as shown by the dotted line, the voltage signal is located in the region surrounded by the solid lines, i.e. the controlable region, the display can be stably controlled from 5° C to 50° C.

Description has made on the embodiment in which the driving frequency for a liquid crystal is varied continuously. Now, a fourth embodiment will be described in which the repetition time of the driving voltage signal is varied stepwise with respect to the temperature.

Figure 18:
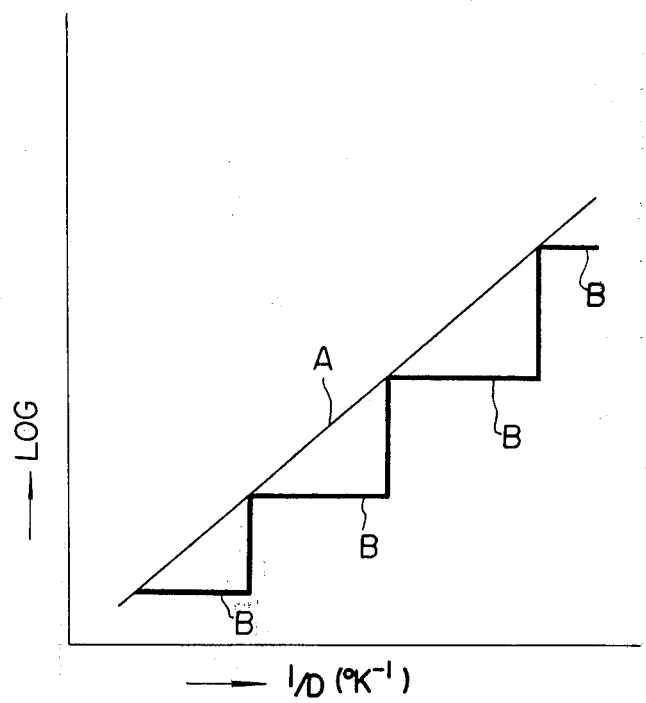
FIG. 18 shows the repetition time of the output signal of another circuit example as a function of the inverse of the temperature.

FIG. 18 illustrates the principle of this embodiment, in which line A corresponds to the solid line $F_2$ of FIG. 12, line B represents the repetition time of the driving voltage signal, the abscissa represents the inverse of the absolute temperature and the ordinate represents the repetition time. A circuit example for this method is shown in FIG. 19.

Figure 19:
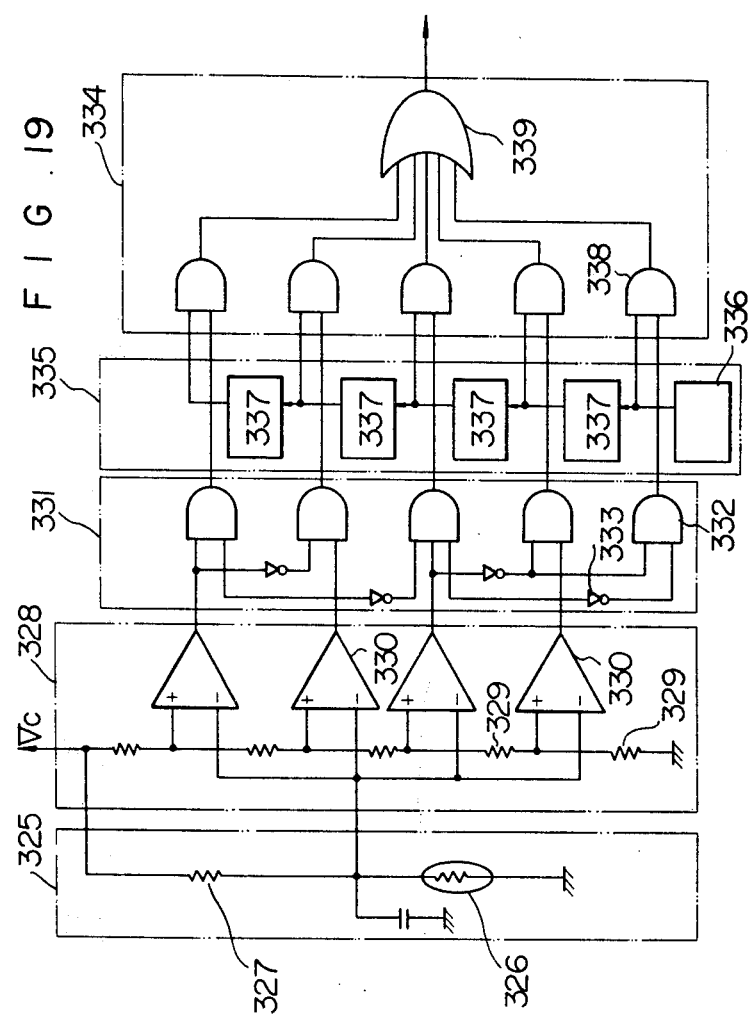
FIG. 19 is an electric connection diagram of another embodiment of the temperature information unit.

In FIG. 19, a temperature detector unit 325 includes a voltage driving circuit consisting of a thermistor 326 and a resistor 327 to divide a reference voltage $V_C$ from a constant voltage source (not shown) and supply a temperature signal. A comparator unit 328 compares the terminal voltage of the comparison resistor 329 and the temperature signal from the preceding stage in comparators 330. The comparator 330 supplies an output 0 when the temperature signal voltage is larger than the terminal voltage of the resistor 329, and an output 1 when the former is smaller than the latter. Namely, when the temperature is highest, the temperature signal voltage is lower than the inversion voltage of any comparator and thereby the comparators supply outputs of 1. As the temperature decreases, the thermistor resistance and hence the temperature signal voltage increases, and the comparators are inverted successively from the lower end to the output of 0. At the lowest temperature, all the comparators 330 supply the outputs of 0. A selection commander 331 consists of AND circuits 332 and inverters 333 and drives a frequency selection unit 334 according to the signal of the comparator unit 328. The outputs of this selection commander are always one 1 and other 0. As the temperature is lowered, the position of the output 1 shifts from the lower end to the higher end. The oscillator unit 335 consists of an oscillator 336 and frequency dividers 337.

The oscillator 336 has a repetition time of 90 microseconds. The frequency dividers 337 are ½ frequency dividers respectively so that the repetition time of the output of these frequency dividers is successively two times as large as the preceeding output ranging from 90 microseconds to about 1.4 milliseconds.

Said frequency selector unit 334 consists of AND circuits 338 and an OR circuit 339 and selects the output frequencies of the oscillator unit 335 by the output of the selection commander 331. The output of the circuit of FIG. 19 is transformed into and used as a clock signal. Thus, the drive repetition time of the liquid crystal display is about 40 milliseconds at the lowest temperature, decreases to one half each time as the temperature is raised, and is about 2.5 milliseconds at the highest temperature. Accordingly, the liquid crystal display could be driven over a wide temperature range from 5° C to 50° C. In the example of FIG. 19, frequency dividers are used to provide different frequency sources, but it is apparent that independent oscillators may be employed as these frequency sources.

Figure 20:
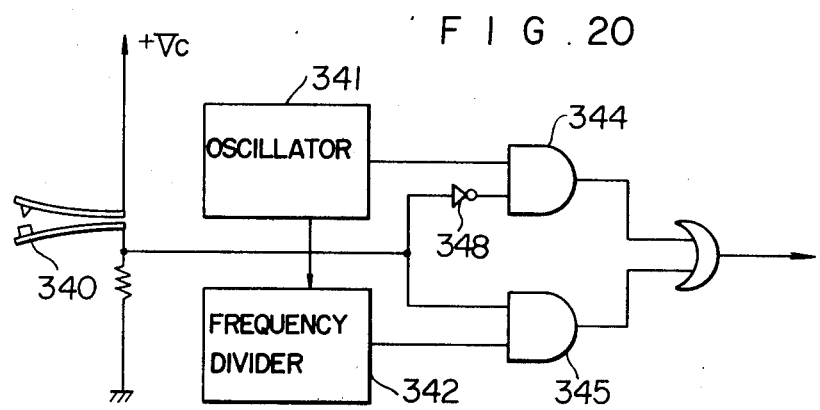
FIG. 20 is an electrical connection diagram of another embodiment of the temperature information unit.

The fifth embodiment is shown in FIG. 20. In FIG. 12, the controllable region has a certain width. If the repetition time is arranged to change-over around 35° C, e.g. 2.5 milliseconds above 35° C and 10 milliseconds below 35° C, then the controllable region extends to the region from 5° C to 50° C.

In the embodiment of FIG. 20, a bimetal 340 is used which opens contacts above 35° C. An oscillator 341 has a repetition time of 0.09 millisecond and a frequency divides 342 divide the frequency of the input signal (output of the oscillator 341) into one quarter. The voltage signal due to the switching operation of the bimetal 340 is supplied through an inverter 348 to an AND circuit 344 or directly to an AND circuit 345 to select a frequency.

The drive repetition time can be made 2.5 milliseconds above 35° C and about 10 milliseconds below 35° C by transforming the output of the circuit of FIG. 20 into the clock signal waveform and using as the clock signal. Thus, the control region of FIG. 12 can be covered.

Figure 21A:
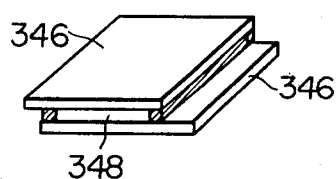
FIGS. 21a to 21d show basic structures of the liquid crystal cell for measuring the resistivity.
Figure 21B:
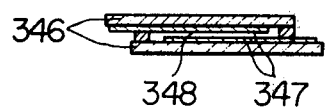
Figure 21C:
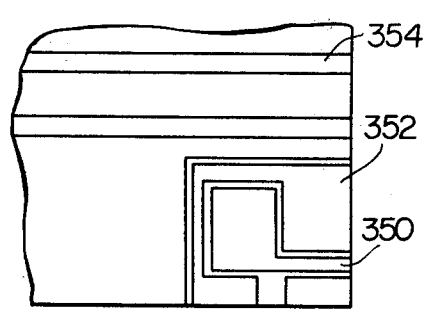
Figure 21D:
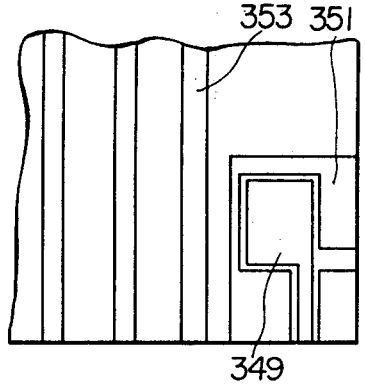

In the above embodiments, the temperature detector is formed with the use of a thermistor or a bimetal. In the next embodiment, however, the temperature dependence of the resistivity of the liquid crystal is used to detect the temperature. Namely, the resistivity of the liquid crystal is detected by a resistivity measuring liquid crystal cell formed in or out of the liquid crystal cell display to control the repetition time of the voltage signal therewith. FIGS. 21a and 21b show a basic structure of the resistivity measuring liquid crystal cell to be disposed near the display from the practical point of view. Two substrates 346 are provides with respective electrodes 347 and sandwiches a liquid crystal layer 348. FIGS. 21c and 21d show resistivity measuring segments mainly used to measure the resistivity of the liquid crystal in the display plate. These figures show parts of the electrode patterns formed on substrates of glass, etc. both of which are seen from the glass side or from the electrode side. In the figures, numerals 349 and 350 denote electrodes for measuring resistivity. A pair of auxiliary electrodes 351 and 352 are provided to prevent the voltage applied to display electrodes 353 and 354 from affecting the voltage between the resistance measuring electrodes 349 and 350. In practical use, the electrodes 349 and 350 on the glass substrates are registration and hold a liquid crystal therebetween.

The resistivity of a liquid crystal changes with the temperature and can be used as a temperature detector in the present system.

Figure 22A:
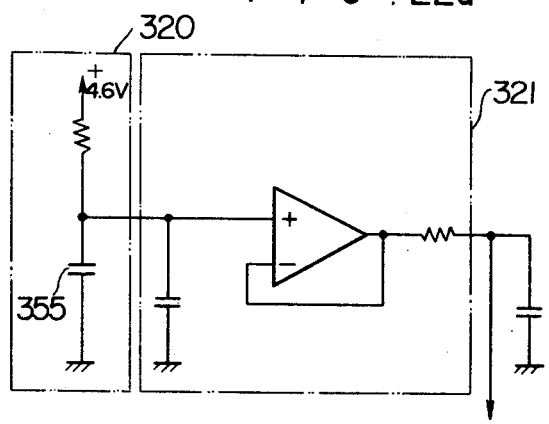
FIGS. 22a and 22b are block diagrams of the circuit using the cell shown in FIGS. 21a to 21d.
Figure 22B:
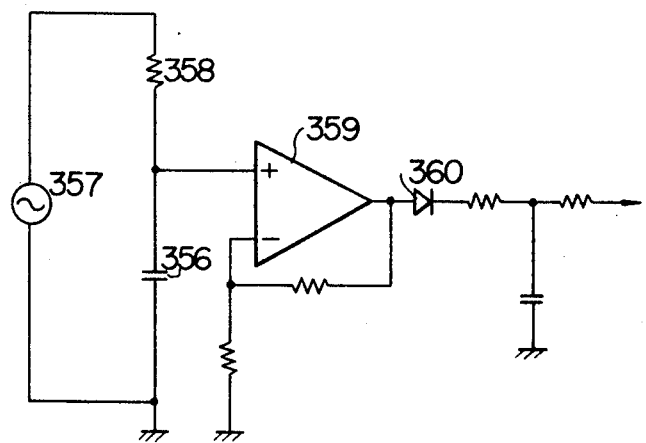

For example, the detector unit 320 and the amplifier unit 321 of the circuit of FIG. 15 may be replaced with a resistance measuring liquid crystal cell of FIGS. 21a and 21b or FIGS. 21c and 21d, as is shown in FIG. 22a. The resistance measuring cell 355 generally has a high impedance, above several hundred kiloohms. Therefore, an amplifier unit 321 arranged specially as a voltage follower, receives a resistance signal with a high input impedance, and supplies an output to the next stage with a low output impedance. Further, this liquid crystal cell can also be used in the circuit of FIG. 19. FIG. 22b shows an example in which the resistance of a resistance measuring liquid crystal cell 356 is measured with a.c. The output of an a.c. source 357 is divided by a resistor 358 and the liquid crystal cell 356. An amplifier unit 359 performs impedance transformation and amplification. Then, the signal is rectified by a diode 360, smoothed through a smothing circuit and sent to the next stage.

In the above description, the repetition time of the clock signal itself is changed with the temperature. Next, an embodiment of a liquid crystal display will be described in which the repetition time of the clock signal for activating the logic circuit is fixed and the repetition time of the driving voltage signal is changed with the temperature.

FIG. 23a shows schematically a system for changing the repetition time of the voltage signal with the temperature by a sampling transformer controlled by the temperature information. In the figure, numeral 361 indicates a logic circuit unit, 362 a register for storing the displayed matter, 363 a temperature information unit having functions as described in the preceeding embodiments and controlling a sampling transformer 364. For example, it is assumed that the waveform at point G is as shown by $V_G$ of FIG. 23b and has a duty ratio of 1/5 and a pulse width of H seconds as in the figure. At high temperatures, the output from the sampling transformer 364 becomes $V_{J1}$ by the control signal from the temperature information unit 364. In this case, the pulse width becomes 6H seconds. At low temperature, the sampling transformer 364 is controlled by the control signal from the temperature information unit 363 and transforms $V_G$ into $V_{J2}$. In this case, the pulse width becomes 11 H seconds. In such a manner, signals are successively transformed by the sampling transformer 364 and the pulse width becomes $(nN + 1)$ H seconds, where N is the inverse of the duty ratio, e.g. 5 in the case of FIG. 23b, and $n$ is an integer. In this manner, the signal having a repetition time controlled by the temperature information drives a liquid crystal display 368 through a decoder 365, and driving circuits 366 and 367. According to this method, for example in the case of a desk-top type electronic computer, the operation speed is maintained constant irrespective of the temperature change and only the repetition of the display unit can be changed with the temperature.

What we claim is:

1. Apparatus for driving a liquid crystal display device having a matrix structure including two flat substrates, a nematic liquid crystal layer and first and second groups of electrodes disposed respectively on opposite surfaces of said substrates, the electrodes of said first group, the electrodes of said second group and the liquid crystal layer interposed therebetween defining at least one electrode intersection, said apparatus comprising:

a. a plurality of first controllers, each of said first controllers having first, second and gating inputs and an output coupled to an associated electrode of said first group;

b. a plurality of second controllers, each of said second controllers having first, second and gating inputs and an output coupled to an associated electrode of said second group;

c. first and second pulse driving voltage means coupled to the first inputs of said first and second controllers respectively for applying pulse driving voltages having a predetermined frequency to selected electrodes of said first and second groups;

d. temperature detector means coupled to said liquid crystal display device for measuring the temperature adjacent said nematic liquid crystal layer, said temperature detector means changing the magnitudes of the voltages applied to all of the electrodes of said first and second groups in accordance with changes in the temperature of said liquid crystal layer;

e. first a. c. signal generating means coupled to the second inputs of said first and second controllers, said first a. c. signal generating means generating a first signal voltage having a frequency higher than that of said first and second pulse driving voltages; and f. second a. c. signal generating means coupled to the gating inputs of said first and second controllers, said second a. c. signal generating means generating a second signal voltage having a frequency different from that of said first and second pulse driving means for controlling application of said pulse driving voltages and first a. c. signal to said first and second groups of electrodes, dynamic scattering being produced in said liquid crystal layer at positions defined by the intersections of electrodes of said first and second groups to which pulse driving voltages have been applied and dynamic scattering being suppressed at the other electrode intersections, the temperature range wherein dynamic scattering is produced being widened as a result of the change in magnitude of the voltage applied to said electrodes as a function of the change in temperature of said liquid crystal layer.

2. Apparatus for driving a liquid crystal display device as defined by claim 1, wherein said temperature detector means comprises a temperature detector for measuring the temperature adjacent said liquid crystal layer and a variable voltage source coupling said temperature detector to said liquid crystal display device.

3. Apparatus for driving a liquid crystal display device as defined by claim 1, wherein at least one of said controllers comprises:

a first OR gate having a first input coupled to said pulse driving voltage means, a second input coupled to the output of said first a. c. signal generating means and an output;

a first AND gate having a first input coupled to the output of said first OR gate, a second input and an output;

a second AND gate having a gating input coupled to the output of said second a. c. signal generating means, a second input and an output;

first and second inverters, said first inverter being coupled between the output of said second a. c. signal generating means and the second input of said first AND gate, said second inverter being coupled between the output of said first OR gate and the second input of said second AND gate;

a second OR gate having a first input coupled to the output of said first AND gate, a second input coupled to the output of said second AND gate and an output; and a transistor coupled between the output of said second OR gate and an electrode of said liquid crystal display device.

4. Apparatus for driving a liquid crystal display device as defined by claim 3, wherein first and second resistors are coupled to the collector of said transistor, the resistance of at least one of said resistors being determined by the temperature adjacent said nematic liquid crystal layer to control the magnitude of the voltage applied to said electrodes in accordance with said temperature.

5. Apparatus for driving a liquid crystal display device as defined by claim 4, wherein said first and second resistors have positive and negative temperature characteristics respectively.

6. Apparatus for driving a liquid crystal display device as defined by claim 1, wherein a third inverter is interposed between said second a. c. signal generating means and the gating inputs of said second controllers.

7. Apparatus for driving a liquid crystal display device as defined by claim 1, wherein third and fourth inverters are interposed between said second and first a. c. signal generating means respectively and the gating and second inputs of said second controllers respectively.

8. Apparatus for driving a liquid crystal display device having a matrix structure including two flat substrates, a nematic liquid crystal layer and first and second groups of electrodes disposed respectively on opposite surfaces of said substrate, the electrodes of said first group, the electrodes of said second group and the liquid crystal layer interposed therebetween defining at least one electrode intersection, said apparatus comprising:

a. a plurality of first controllers, each of said first controllers having first, second and gating inputs and an output coupled to an associated electrode of said first group;

b. a plurality of second controllers, each of said second controllers having first, second and gating inputs and an output coupled to an associated electrode of said second group;

c. first and second pulse driving voltage means coupled to the first inputs of said first and second controllers respectively for applying pulse driving voltages having a predetermined frequency to selected electrodes of said first and second groups;

d. temperature detector means coupled to said liquid crystal device for measuring the temperature adjacent said nematic liquid crystal, said temperature detector means changing the frequency of the voltages applied to all of the electrodes of said first and second groups in accordance with changes in the temperature of said liquid crystal layer;

e. first a. c. signal generating means coupled to the second inputs of said first and second controllers, said first a. c. signal generating means generating a first signal voltage having a frequency higher than that of said first and second pulse driving voltages; and f. second a. c. signal generating means coupled to the gating inputs of said first and second controllers, said second a. c. signal generating means generating a second signal voltage having a frequency different from that of said first and second pulve driving means for controlling application of said pulse driving voltages and first a. c. signal to said first and second groups of electrodes, dynamic scattering being produced in said liquid crystal layer at positions defined by the intersections of electrodes of said first and second groups to which pulse driving voltages have been applied and dynamic scattering being suppressed at the other electrode intersections, the temperature range wherein dynamic scattering is produced being widened as a result of the change in frequency of the voltage applied to said electrodes as a function of the change in temperature of said liquid crystal layer.

9. Apparatus for driving a liquid crystal display device as defined by claim 8, wherein said temperature detector means comprises a temperature detector for increasing the temperature adjacent said liquid crystal layer and a variable frequency source coupling said temperature detector to said liquid crystal display device.

10. Apparatus for driving a liquid crystal display device as defined by claim 8, wherein a third inverter is interposed between said second a. c. signal generating means and the gating inputs of said second controllers.

11. Apparatus for driving a liquid crystal display device as defined by claim 8, wherein third and fourth inverters are interposed between said second and first a. c. signal generating means respectively and the gating and second inputs of said second controllers respectively.

* * * * *